June 6, 1967     F. DOBROWSKY ETAL     3,323,905
METHOD AND APPARATUS FOR ADDING AGENTS FOR FORMING
AND/OR TREATING THE SLAG IN IRON BATHS
Filed Sept. 22, 1964     3 Sheets-Sheet 1

FIG. 1

United States Patent Office 3,323,905
Patented June 6, 1967

3,323,905
METHOD AND APPARATUS FOR ADDING AGENTS FOR FORMING AND/OR TREATING THE SLAG IN IRON BATHS
Ferdinand Dobrowsky and Kurt Rösner, Leoben-Donawitz, Wolfgang Kühnelt, Leoben, and Felix Grohs, Vienna, Austria, assignors to Oesterreichisch-Alpine Montangesellschaft, Vienna, Austria
Filed Sept. 22, 1964, Ser. No. 398,282
Claims priority, application Austria, Sept. 23, 1963, A 7,646/63
4 Claims. (Cl. 75—52)

The invention relates to a method and apparatus for adding agents for forming and/or treating the slag in iron baths.

When manufacturing steel by refining iron baths, it is necessary to have the cooperation of slag in a fluid reactive state, particularly when refining by the basic methods. It is therefore very important for the fluid slag to form quickly in the region of the iron bath's surface and for the slag composition most suitable in each phase of the process for steel production to be established promptly, especially in the converter refining processes in which the process takes place very fast, so that the steel production process can be carried out economically and from a metallurgical point of view successfully, and so that the quality of the steel produced can therefore be maintained.

In converter refining processes, the slag-forming materials, which in basic processes generally consist of lime and possibly other oxides and carbonates of alkaline-earth metals and alkali metals, and also perhaps iron oxides in the form of substances containing iron oxide (such as iron ores, mill scale, and smelting dust) and finally perhaps fluxing agents such as limestone flux, bauxite and silicio acid carriers, were at first added as coarse lumps before refining was begun. This is still done to a large extend today. It has been shown that with this manner of operation in bottom-blown refining, i.e. in the Thomas process, a substantial proportion of the lime does not dissolve until very late and usually some of it does not dissolve at all, i.e. does not act. However, even with top-blown refining, in which the reaction of the oxygen with the iron bath occurs near the surface and slag is therefore formed faster because the heat generation takes place near the surface of the bath, the lime is only dissolved gradually. To make a fluid, sufficiently basic calcium ferrite slag form faster, the practice has been increasingly adopted to add the lime gradually in portions, with one portion being added before or at the start of refining and further portions during refining. In this connection, the lime has also been added in fine, graded lumps, which has advantages as regards dephosphorization and desulphurization.

Finally, it has been found useful, particularly when treating pig iron with a high phosphor content, to add the lime and if necessary other slag-forming materials gradually in powder form. This, however, can only be done by injection into the refining vessel or converter, because otherwise at least some of the powder is carried out of the converter again by the exhaust blast. In large-scale production, the lime in this case is generally added with the gaseous refining agent. In top-blown refining, the LDAC and OLP methods have developed on this basis. Comparative tests, however, have shown that the metallurgical effect of this method of admixture does not differ greatly from that of a pressureless admixture of small graded lumps of lime with a grain size of about 5 to 20 mm. In bottom-blown refining, also, it has been suggested that pulverized slag-forming agents might be added with the blast, but in practice this involves certain difficulties.

The main disadvantage of injecting pulverized slag-forming materials, particularly lime, with the gaseous refining agent is that the introduction of the powder into the high-pressure refining agent by means of cell charging valves is difficult and unreliable. Automatic feeding from the bunkers to the feed devices is also difficult and unreliable. If a mixture of slag-forming materials is to be injected, this has to be kept ready-mixed in practice, and it is not possible to change the proportions temporarily according to the metallurgical behaviour of the charge concerned.

The powder moving with the flow of refining agent also causes much wear on the pipes, particularly the hoses, by which the movable blowing lance is attached in top-blown refining, and on the nozzle. The abrasion of the nozzle may lead to variations in the metallurgical course of the process, while the wear on the pipes may result in interruptions in the blowing process. Finally, if the slag-forming materials are added with the refining agent, the power for blowing the slag-forming materials cannot be adjusted separately from the power with which the refining agent is blown, and in certain cases it is not possible to prevent the refining agent from affecting additives, e.g. materials for reducing the iron oxides in the slag.

An attempt has also been made to feed the pulverized slag-forming materials separately from the refining agent. Even if a separate supply lance is provided for this, the difficulties described are only partly avoided. The carrier gas used must normally again be oxygen. Inert carrier gases, CO and $CO_2$, require a special generator plant and are uneconomical. When air is used, dust losses cannot be avoided at a low jet power, while at a higher jet power the iron bath absorbs nitrogen and the quality is lowered.

The additives, particularly lime, may be fed to the oxygen jet, for example by a ring nozzle which is not under pressure. This removes the drawbacks arising from the feed into the high-pressure refining agent before discharge from the nozzle and those arising from the abrasive action, but also in this type of feed the power for the feed for the refining agent and that for the feed for the additives are not independent of each other. It is not possible, for instance, to feed the refining agent at such a power that it passes through the slag layer and reaches the iron bath, while feeding the additives at a power low enough for them only to act on the slag. Also, the additives cannot be protected from possible chemical action by the refining agent, and the refining agent supply cannot be interrupted while that of the additives is continued at an adjustable power.

The object of this invention is to avoid the drawbacks described in connection with the known methods of feeding in additives for forming and/or treating slag, such as cooling agents or means for influencing the chemical composition of the slag.

The invention consists in that at least a proportion of the additives, which range in form from granular to dusty, is being conveyed to the bath surface by a flow of gas, preferably air, passing through the supply lance in a spiral stream.

This method of feeding is at first completely independent of the feed for the refining agent, e.g. as regards power, time or chemical influence by the refining agent. A flow of gas which rotates about the axis of the supply lance, i.e. moves spirally in the supply lance, and which advances in an approximately helical manner in the lance, carries material along with it like a whirlwind in the region along the axis of the helix (that is, the axis of the supply lance), and forms itself a sort of lining on the inside wall of the lance tube. This inside wall is then largely protected from the abrasive action of the additives, as is well known from vortex blast conveyors (whirl air flow pneumatic conveyors). The supply to the lance is also easy. Air, acting as the carrier gas, can simply be taken from the compressed air lines which operate at relatively low pressures. The quantity of gas, preferably air, required to convey the additives is small. It has been proved that with this method of feeding additives ranging from granular to dusty, the latter are distributed over all or at least a substantial part of the bath surface. This is shown for example by the fact that in top-blown refining with oxygen the spraying of the uncovered bath observed before either does not occur at all or ceases after a very short time. It has also been found that with this method of feeding the blowing conditions can be adjusted in every case so that on the one hand there is not a greater quantity of dust in the exhaust gas, whereas on the other, the carrier gas has no chemical effect on the iron bath. Thus, for example, air can easily be used as the carrier gas without the iron bath being choked. The swift formation of a fluid reactive slag can also be concluded from the metallurgical effects attained, such as the reduction in the P and S content compared with when lump lime or graded lime are used, as comparative experiments have shown. In contrast with the known feeding methods, the method can be applied universally. Not only can it be used for feeding, for example, slag-forming materials, cooling agents for the slag such as limestone grit or means for changing the chemical composition of the slag, such as reducing agents, e.g. carbon dust, or ferrosilicon dust; it is also possible, as shown below, to feed variable mixtures of very different additives in order to adapt the chemical composition of the slag to the requirements at any stage in the process.

This can be done in practice in particular if, as well as effecting the direct feed to the bath surface near the converter by means of a carrier gas which is itself in a spiral stream in the supply lance, the whole of the feed from the bunker to the supply lance is effected by a carrier gas which is in a spiral stream in this supply lance, as is well known from vortex blast conveyors. It is then possible to locate the bunkers further from the converter and make the feed to the slag-formation point take place in one go, without separate charging into the lance.

Thus, the bunkers no longer have to be housed in the limited space in the region above the converter. If dust from the exhaust gas is to be used as an additive containing iron oxide (particularly dust from the exhaust gases in top-blown refining with pure oxygen), it can be brought from the point where it collects in the precipitator direct to the slag formation point. These are further advantages. Another is that branch currents with the most varied sorts of additives can be combined into a single current in a manner known in vortex blast conveyors, and individual branch currents can be brought to the pipe in front of the lance with switches known in vortex blast conveyors. It is then possible, by changing the conveying conditions (e.g. air pressure, blowing direction of the nozzles in the nozzle rings) in the different branch currents, to bring adjustable mixtures of additives to the slag formation or slag treatment point, or by suitable temporary regulations of the switches to send temporarily and successively regulable quantities of the various slag-forming materials to the slag formation point. In this way, the slag composition desired at the time also can be established.

In an apparatus for carrying out the method according to the invention, therefore, the supply lance is fitted with a ring of approximately tangentially and obliquely arranged gas entry nozzles in a manner known in vortex blast conveyors.

The invention will now be described, by way of example only, with reference to the accompanying schematic drawings in which:

FIG. 1 shows a plant for top-blown refining in which the additives are introduced into the refining vessel by way of a supply lance constructed according to the invention;

FIG. 1 shows plant for top-blowing refining, in which additions to the metal bath are made with the aid of a swirling stream of a carrier gas which transports the material to be added from a bunker to a supply lance by which they are fed into the refining vessel by the method according to the present invention.

Figure 2:
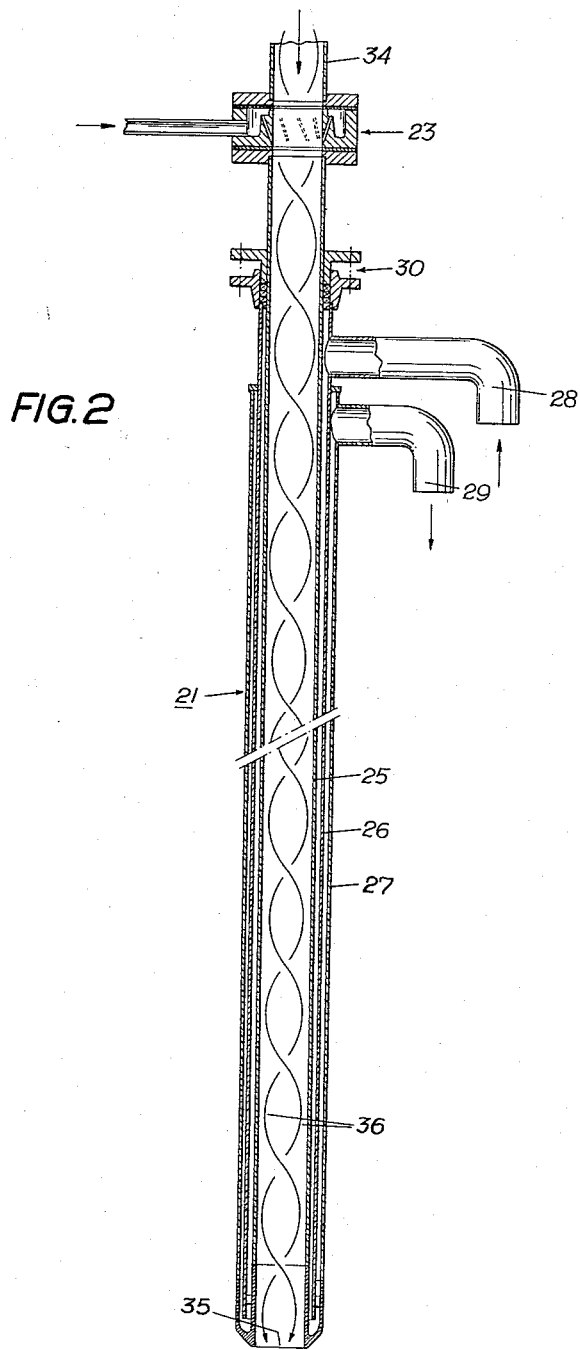
FIG. 2 shows a section through a supply lance.

A bath 1 of hot metal is refined in a converter 2 having a closed bottom by commercially pure oxygen fed from an oxygen plant (not shown) by way of a reservoir 4 and pressure-reducing and -controlling means 5 to a water-cooled oxygen lance 3, whose lower end has a nozzle from which the oxygen is blown on to the bath surface.

The gases arising from refining, mainly CO, burn at the converter mouth with the secondary air which flows in as indicated by arrows 6. These waste gases, carrying a considerable proportion of very fine dust, mainly iron oxides, exhaust through converter flue 7, possibly after suitable cooling to a precipitator 8. The precipitated dust is collected in a hopper 9.

The other materials to be added, e.g. lime and fluxes, are stored in respective hoppers 10 which can be situated at a distance from the converter and thus need not encroach on the limited space above the converter as in conventional plant. The hoppers may be closed to avoid for example undesirable absorption of moisture by fine lime. These materials are fed from the hoppers 9, 10 to a supply lance 21 on the converter by a spiral stream of compressed air with the help of a known "vortex blast conveyor."

To this end, there is provided below each hopper 9, 10 a despatching vessel 11 constructed in the usual manner of a vortex blast conveyor as a cylindrical sheet steel vessel, whose top can be closed pressure-tight and which has a frustoconical downward projection. In this projection a plurality of nozzles are provided which open into the inside of the vessel and are equispaced over the circumference in a number of rows one above the other. These nozzles communicate with a compressed air line and are so directed that the compressed air can enter the vessel approximately tangentially and in a downward direction.

Each despatching vessel is filled with the desired quantity of the additive needed from its hopper, which is constructed as a balance hopper, by remote control of the discharge valve for the hopper. When an additive is fed to the converter, a closure bell 13 in the despatching vessel 11 concerned is shut by remote control from a control desk 12, and compressed air flowing from a compressor 14 through an air reservoir 15 into compressed air line 16 is caused to flow through the nozzles into the despatching vessel by remote control of a valve 17. This arrangement of nozzles allows the compressed air to enter the lower part of the despatching vessel in a spiral stream, set the granular or dusty additive in rotation and conveys it in the axial region of the spiral stream through a feed pipe 18, possibly by way of a tube switch 19 which has first been set by remote control, and through a hose 20 into the supply lance 21 and to the bath 1. Along the feed pipe 18, at certain suitable distances found by trial and error, there are nozzle rings 22, known as vortex amplifiers, whose nozzles are directed approximately tangentially and forwardly in the direction of flow. Simultaneously with the influx of compressed air into one of the despatching vessels, compressed air is let into the nozzle rings 22 by remote control, so that it maintains or amplifies by its spiral momentum the spiral stream coming from the despatching vessel and conveying the material to be added. A similar nozzle assembly 23 is fitted to the top end of the supply lance 21 to ensure a spiral stream in the lance. The broken lines 24 represent electrical leads for operating the electric drives of the valves for the vortex amplifiers, the switches and the despatching vessel closures by remote control from the control desk 12.

The supply lance 21 shown in FIG. 2, which is for injecting the additives into the converter, consists of the water-cooled lance tube proper and the nozzle assembly 23 attached to the top end thereof. The lance tube comprises three concentric steel tubes, inner tube 25, outer tube 27 and intermediate tube 26 which extends almost to the bottom end of the lance and serves to bring the stream of cooling water to this end. The inner tube 25 and outer tube 27 are joined at the bottom of the lance. The cooling water enters through a pipe connection 28, moves down the annular space between the tubes 25 and 26, flows around the bottom of tube 26 and up again through the annular space between the tubes 27 and 26 to be carried away by a pipe connection 29. To prevent differing thermal expansions from causing deformation of the lance, the inner tube 25 is displaceable longitudinally in the tube 26 by means of a closure sleeve 30. The nozzle assembly 23 is flanged at the top of the inner tube 25 and has, preferably, the same internal diameter as the inner tube 25 of the lance, so that the flow of compressed air used as a carrier gas is not hindered.

Figure 3:
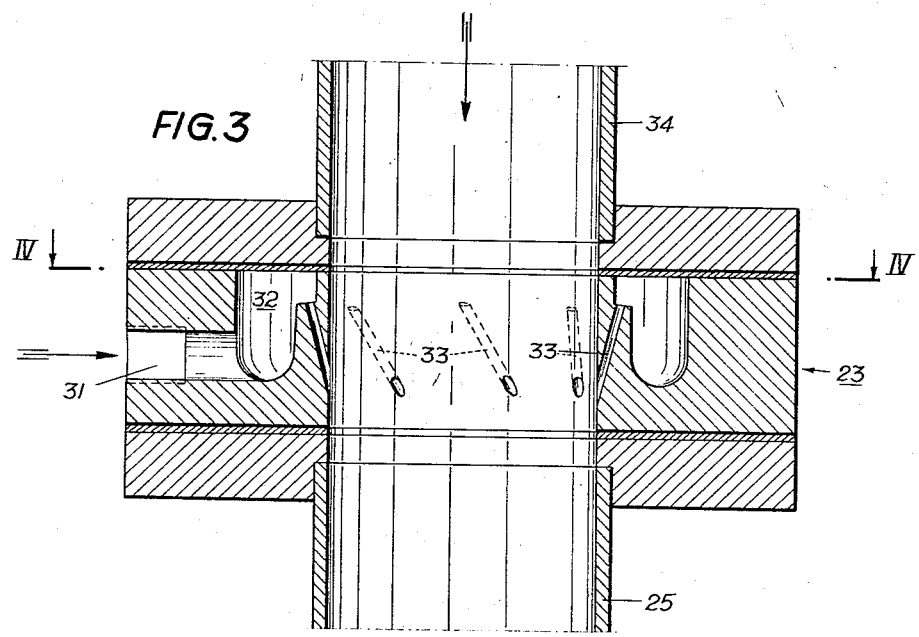
FIGS. 3 and 4 show a nozzle assembly with the gas entry nozzles for bringing the flow of gas into the supply lance, with FIG. 3 being a section along line III—III in FIG. 4 and FIG. 4 being a section along line IV—IV in FIG. 3.
Figure 4:
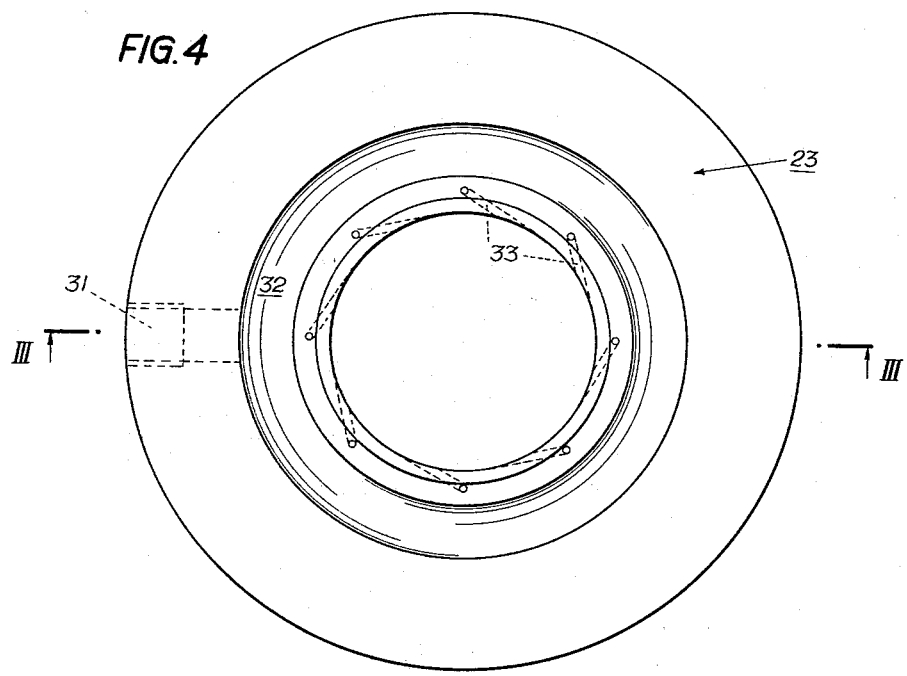

This nozzle assembly 23 is shown in detail in FIGS. 3 and 4. The compressed air enters the nozzle assembly at 31, flows into annular space 32 and from such space into a number of gas entry nozzles 33 which are equispaced along the circumference and are directed approximately tangentially and downwardly (i.e. forwardly in the direction of flow). Through these gas entry nozzles 33 the compressed air flows into the inside of the lance in which it forms a spiral or screw-like stream moving towards the bottom of the lance. The finely granular or powdery materials which are to be injected into the converter are fed to a pipe connection 34 flanged above the nozzle assembly by a carrier gas travelling in a spiral stream. The materials entering through pipe connections 34 are then fed by the jets of compressed air passing out from the nozzles 23 in the central region of the spiral stream through the lance and to bottom aperture 35 of the lance, and are injected through this aperture on to the surface of the bath in the converter. This spiral stream is indicated by spiral lines 36 in FIG. 2.

The method according to the invention will now be described in greater detail with reference to examples.

All examples relate to top-blown refining of pig iron with commercially pure oxygen in a tiltable converter with a closed bottom, and were carried out in a plant as shown in FIG. 1 of the drawings. Separate hoppers and despatching vessels were provided for the various fluxing agents.

*Example 1*

The basic converter 2 was tipped towards the charging bay after the previous smelt had been tapped, and 5000 kg. of scrap averaging 0.08% C, 0.35% Mn, 0.01% Si, 0.020% P and 0.030% S was fed from a chute. Then 35000 kg. hot metal with 4.23% C, 2.38% Mn, 0.21% Si, 0.082% P and 0.031% S were emptied from a ladle. The converter was then returned to the vertical position, and 600 kg. of burnt lime with a lump size of about 40–80 mm. was fed through a chute on to the surface of the hot metal bath 1.

The oxygen lance 3 and supply lance 21 were then inserted into the converter from above and lowered until the mouth of the oxygen nozzle, with an internal diameter of 40 mm., at the bottom of the oxygen lance 3 was at a distance of 1300 mm. and the mouth of the supply lance was at a distance of 1700 mm. from the still surface of the hot metal bath, and the injection of commercially pure (99.5%) oxygen was begun. (Start of refining.) The oxygen pressure in front of the oxygen lance 3 was set at 8 atm. gauge with the pressure-reducing and -controlling means 5. The flow of oxygen was then about 110 Nm.$^3$O$_2$/min. There was much sparking of the hot metal bath, which was not yet covered with slag. 200 kg. of dust (LD dust) precipitated in the precipitator 8, with 86.4% Fe$_2$O$_3$, 4.4% MnO, 4.2% CaO and 0.9% SiO$_2$, was emptied from the hopper 9 into the appropriate despatching vessel 11 by remote control of discharge means 37. A minute after refining began, also by remote control from the control desk 12, compressed air was introduced into the respective despatching vessel 11 and the nozzle rings 22 and 23 from the pipe 16 (pressure 3.5 atm. gauge). This caused the compressed air in the supply pipe 18 and the supply lance 21 to form a spiral stream in whose central region the LD dust was fed to the supply lance and through it on to the surface of the bath in the converter. After about a minute, i.e. two minutes from the start of oxygen blowing, the injection of the 200 kg. LD dust was finished. The sparking of the bath had subsided. Meanwhile one despatching vessel 11 had been filled with 600 kg. fine lime from a lime hopper 10, and another with 200 kg. quartz sand from a quartz hopper 10. In the third and fourth minutes these materials were fed by compressed air, set moving in a spiral stream as above, into the converter and on to the bath surface. By remote control of the compressed air feed and the tube switches, this was done so that about 100 kg. fine lime and about 30 kg. quartz sand were supplied alternately. The sparking stopped, and four minutes from the start of smelting the bath was covered with a fluid slag layer which began to foam. In the fifth minute, another 200 kg. LD dust was injected in the same manner, the slag foamed considerably, the level of the slag surface rose quickly, and the noise from the oxygen jet could no longer be heard five minutes after oxygen refining was begun. Six minutes from the start of blowing observations of the converter showed that the process was advancing uniformly and at the time all materials added were dissolved in the very fluid slag. For adequate basicity of the slag and better dephosphorization, the injection of a further 600 kg. fine lime was begun at this point, and this was finished after about 1½ minutes. The slag was foaming well, and all observations of the converter showed that the process was taking place satisfactorily. Fifteen minutes from the start of oxygen blowing, the noise of the oxygen jet became audible again, a sign that the generation of CO was ending and therefore that the C content of the iron bath had already reached a low figure. After another 1½ minutes the oxygen lance was retracted, the oxygen supply cut off and the converter tipped towards the casting house side. The dip temperature measurement gave a bath temperature of 1630° C., and steel and slag casting tests were satisfactory. The steel was tapped into the ladle and poured in a rimmed state. The steel analysis came to 0.07% C, 0.39% Mn, 0.00% Si, 0.011% P and 0.017% S, and the slag analysis to 41.2% CaO, 13.7% SiO$_2$, 17.3% Fe and 14.0% Mn.

In the other examples the various steps were the same as in Example 1. Only the aspects in which they differed from Example 1, therefore, will be mentioned.

*Example 2*

The charge consisted of 5000 kg. scrap with an average of 0.08% C, 0.35% Mn, 0.01% Si, 0.020% P and 0.030% S. 35000 kg. of fluid pig iron with 4.31% C, 2.27% Mn, 0.22% Si, 0.083% P and 0.028% S. No lump lime was inserted, but the whole of the amount of lime needed for slag formation was blown through the supply lance 21 on to the bath surface in the form of fine lime during the process.

The distance of the nozzle of the oxygen lance from the still bath surface was 1300 mm. the oxygen pressure in front of the lance was 8 atm. gauge, the internal diameter of the oxygen nozzle was 40 mm., the internal diameter of the supply lance 100 mm., and the distance of its mouth from the still bath surface 1700 mm.

Immediately after blowing began, over a period of about 3 minutes, there was injection successively of 200 kg. pulverized lime, 100 kg. quartz sand, 400 more kg. pulverized lime and 200 kg. LD dust through the supply lance. The slag was very fluid and foaming began.

From 3 to 5 minutes after the start of blowing another 600 kg. pulverized lime and 100 kg. quartz sand were injected through the supply lance. The slag was foaming well.

In the seventh minute, for one minute, 200 kg. LD dust was injected through the supply lance.

From eight to nine-and-a-half minutes from the start of oxygen refining, another 600 kg. pulverized lime were injected through the supply lance.

15½ minutes from the start of smelting the foam slag began to collapse and the sound of the oxygen jet began to be audible again.

17 minutes from the start of blowing the oxygen lance was retracted, the oxygen supply cut off and the converter tipped towards the casting house side. The dip temperature measurement gave a bath temperature of 1620°, and steel and slag casting tests were satisfactory. The steel was tapped into the ladle and poured in a rimmed state. The steel analysis came to 0.09% C, 0.44% Mn, 0.01% Si, 0.011% P, 0.016% S, and the slag analysis to 39.7% CaO, 12.6% $SiO_2$, 15.4% Fe, 15.6% Mn.

*Example 3*

The charge consisted of 38000 kg. of fluid pig iron with 4.27% C, 2.52% Mn, 0.17% Si, 0.087% P, 0.027% S. No scrap or lump lime was added.

The distance of the nozzle of the oxygen lance from the still bath surface was 1200 mm., the oxygen pressure in front of the lance 8 atm. gauge, the internal diameter of the oxygen lance 40 mm., the internal diameter of the supply lance for the additives 90 mm., and the distance of its mouth from the still bath surface 1800 mm.

In the first four minutes of oxygen refining 300 kg. pulverized lime, 100 kg. quartz sand, another 300 kg. pulverized lime and 400 kg. LD dust were injected one after the other through the supply lance. In the 5th and 6th minutes 600 kg. of Swedish ore concentrate with 61.3% Fe, 0.18% Mn, 3.4% $SiO_2$, 2.0% $Al_2O_3$ and 4.4% CaO was included.

In the 7th and 8th minutes 600 kg. pulverized lime and 100 kg. quartz sand were injected. The slag began to foam.

In the 9th and 10th minutes another 600 kg. of Swedish ore concentrate of the composition given above was introduced, and there was a considerable amount of spilling.

Again, therefore, for about 1½ minutes 600 kg. of pulverized lime was fed to cool the slag. The spilling then stopped and the slag foamed in the normal way.

It was therefore possible then to inject 400 kg. of Swedish ore concentrate for another 1½ minutes. The process proceeded normally.

In the 15th minute the foaming of the slag decreased, and in the 16th minute the sound of the oxygen jet became audible again.

After 17½ minutes of oxygen smelting the oxygen lance was retracted, the oxygen supply cut off, and the converter tipped towards the casting house side. The dip temperature measurement gave a bath temperature of 1630° C., and the steel and slag casting tests were satisfactory. The steel was tapped into the ladle and poured. The steel analysis came to 0.07% C, 0.36% Mn, 0.00% Si, 0.010% P and 0.014% S, and the slag analysis to 40.2% CaO, 14.1% $SiO_2$, 16.7% Fe and 14.3% Mn.

What we claim is:

1. A method for supplying solid material in granular or dust form from at least one container into a converter for refining a metal and slag bath contained therein through a lance and conduit means connecting the container to the upper end of the lance, comprising the steps of creating a spiral stream of a conveyor gas at the connection point of the conduit means to the container, and maintaining said spiral stream by blowing additional conveyor gas streams into the conduit means at spaced points thereof and at the upper end of the lance, with the direction of said additional conveyor gas streams having a tangential and an axial component in the conveying direction thereby feeding the solid material through the conduit means and the lance into the converter against the surface of said bath.

2. A method for supplying solid material in granular or dust form from at least one container into a converter for refining a metal and slag bath contained therein through a lance and conduit means connecting the container to the upper end of the lance, comprising the steps of creating a spiral stream of air at the connection point of the conduit means to the container, and maintaining said spiral stream by blowing additional air streams into the conduit means at spaced points thereof and at the upper end of the lance, with the direction of said additional air streams having a tangential and an axial component in the conveying direction thereby feeding the solid material through the conduit means and the lance into the converter against the surface of said bath.

3. In a device for supplying solid material in granular or dust form from at least one container into a converter for refining a metal and slag bath contained therein, a lance disposed vertically and directed against the surface of said bath, conduit means connecting the upper end of the lance to the container, means for supplying a conveyor gas to the connection point between the conduit means and the container, means for creating a spiral stream of the conveyor gas in the conduit means, means for maintaining the spiral stream disposed at spaced points along the conduit means and at the upper end of the lance and comprising nozzles disposed around the conduit means and lance opening into the conduit means and lance, respectively, and directed tangentially and axially to the direction of flow, and means for supplying additional conveyor gas to the nozzles for conveying the solid material from the container to the bath surface.

4. In a device for supplying solid material in granular or dust form from at least one container into a converter for refining a metal and slag bath contained therein, a lance disposed vertically and directed against the surface of the bath, conduit means connecting the upper end of the lance to the container, means for supplying a conveyor gas to the connection point between the conduit means and the container, means for creating a spiral stream of the conveyor gas in the conduit means, means for maintaining the spiral stream disposed at spaced points along the conduit means and comprising nozzles disposed around the conduit means opening into the conduit means and directed tangentially and axially to the direction of flow, means for maintaining the spiral stream disposed at the upper end of the lance and comprising nozzles disposed around the lance opening into the lance and directed tangentially and axially to the direction of flow, said last named means being interposed between a pipe connection and the upper end of the lance, with the inner diameter of the last named means and pipe connection and lance being equal, and means for supplying additional conveyor gas under pressure to said nozzles for conducting the solid material from the container to the bath surface.

References Cited

UNITED STATES PATENTS

| | | | |
|---|---|---|---|
| 2,817,584 | 12/1957 | Kootz et al. | 75—60 |
| 3,112,194 | 11/1963 | De Vries | 75—52 |
| 3,212,880 | 10/1965 | Rinesch | 75—54 |
| 3,240,481 | 3/1966 | Smith | 75—60 |

FOREIGN PATENTS 916,128    1/1963    Great Britain.

BENJAMIN HENKIN, *Primary Examiner.*